United States Patent
Schernich et al.

(10) Patent No.: US 12,503,006 B2
(45) Date of Patent: Dec. 23, 2025

(54) METHOD AND CIRCUIT ASSEMBLY FOR PRECHARGING A HIGH-VOLTAGE DC VOLTAGE INTERMEDIATE CIRCUIT FOR A MOTOR VEHICLE

(71) Applicant: Preh GmbH, Bad Neustadt a.d. Saale (DE)

(72) Inventors: Matthias Schernich, Bad Kissingen (DE); Maximilian Schneider, Unterpleichfeld (DE); Darrell Parker, Bad Neustadt (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 0 days.

(21) Appl. No.: 18/470,618

(22) Filed: Sep. 20, 2023

(65) Prior Publication Data

US 2024/0092218 A1    Mar. 21, 2024

(30) Foreign Application Priority Data

Sep. 21, 2022    (DE) .................... 10 2022 124 260.9

(51) Int. Cl.
*H02J 7/00* (2006.01)
*B60L 53/20* (2019.01)
(Continued)

(52) U.S. Cl.
CPC ............... *B60L 58/10* (2019.02); *B60L 53/20* (2019.02); *H01M 10/44* (2013.01); *H01M 10/46* (2013.01);
(Continued)

(58) Field of Classification Search
CPC .................................................. B60L 53/11
See application file for complete search history.

(56) References Cited

U.S. PATENT DOCUMENTS

2020/0269710 A1    8/2020  Fong et al.
2021/0101501 A1*   4/2021  Neitz ................ H02J 7/007
(Continued)

FOREIGN PATENT DOCUMENTS

DE    102020201983 A1    10/2020
DE    102022000832 A1     4/2022

OTHER PUBLICATIONS

German Office Action for DE 10 2022 124 260.9, dated Jun. 5, 2023, German Patent and Trade Mark Office, Munich, Germany.

*Primary Examiner* — Daniel Kessie
(74) *Attorney, Agent, or Firm* — M&B IP Analysts, LLC

(57) ABSTRACT

A circuit assembly for precharging a high-voltage DC voltage intermediate circuit for a motor vehicle is provided. The circuit assembly includes a high-voltage battery with battery terminals to which the intermediate circuit is electrically coupled. Intermediate circuit terminals of the intermediate circuit are electrically coupled to corresponding station terminals of a high-voltage charging station for providing a charging current, wherein the intermediate circuit terminals are each selectively, electrically coupled to corresponding feeding points of the intermediate circuit via charging current-connecting switching elements by opening and closing. The switching elements are opened prior to coupling the intermediate circuit terminals to the station terminals. Electric potentials of the feeding points are equalized to each other by a first precharging current. A voltage existing between the intermediate circuit terminals is equalized to a nominal charging voltage by changing the potential of at least one of the feeding points by a second precharging current.

11 Claims, 3 Drawing Sheets

Figure 1:
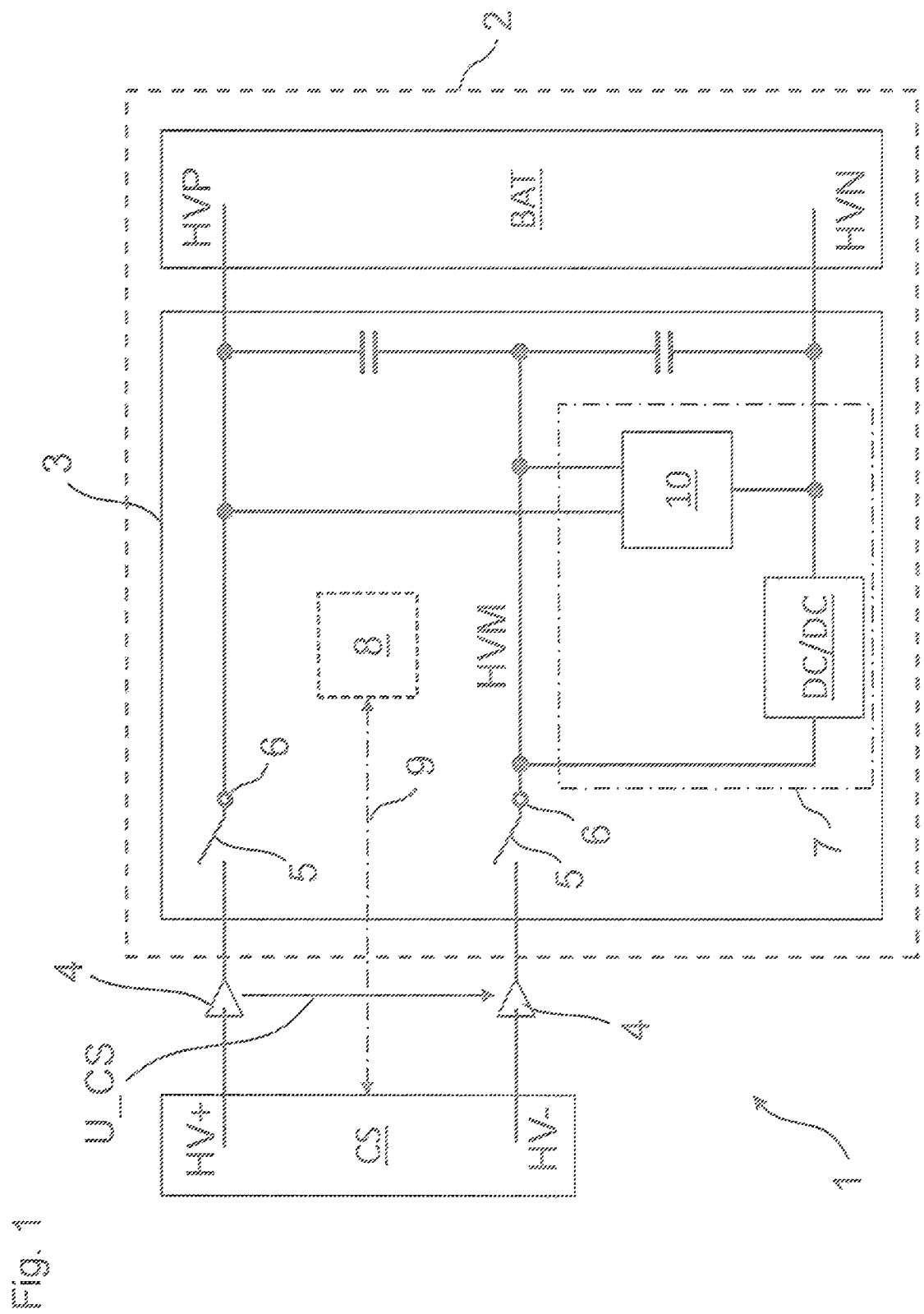

(51) Int. Cl.
*B60L 58/10* (2019.01)
*H01M 10/44* (2006.01)
*H01M 10/46* (2006.01)

(52) U.S. Cl.
CPC ......... *H02J 7/0069* (2020.01); *B60L 2210/10* (2013.01); *H01M 2220/20* (2013.01)

(56) References Cited

U.S. PATENT DOCUMENTS

2021/0138924 A1* 5/2021 Neitz .................... B60L 53/11
2022/0231537 A1 7/2022 Hirota et al.

* cited by examiner

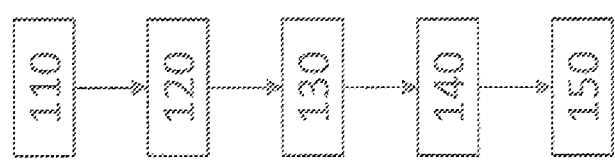
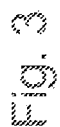

METHOD AND CIRCUIT ASSEMBLY FOR PRECHARGING A HIGH-VOLTAGE DC VOLTAGE INTERMEDIATE CIRCUIT FOR A MOTOR VEHICLE

The present disclosure relates to a method and a circuit assembly for precharging a high-voltage DC voltage intermediate circuit for a motor vehicle, especially an electric vehicle.

Electric vehicles (EV), such as hybrid electric vehicles (HEV) or battery electric vehicles (BEV), for instance, usually have a high-voltage battery (e.g. a traction battery) as an energy storage unit with a nominal voltage of 400 V or 800 V, for instance. Here, as is customary in the automotive sector, an electric direct voltage of greater than 60 V, in particular greater than 200 V, e.g. 400 V or 800 V to about 1500 V, is understood to be a high-voltage or HV-voltage or high-voltage or HV-potential. An electric voltage of equal to or less than 60 V, i.e. 6 V, 12 V, 24 V, 48 V or 60 V, is understood to be a low voltage or LV voltage or low-voltage potential or LV-potential.

The high-voltage battery may be the energy storage unit for the electric drive unit of the motor vehicle, for instance. The HV DC voltage intermediate circuit may be a part of a charging circuit for charging the HV battery at a HV charging station. Usually, the HV battery or the HV DC voltage intermediate circuit is coupled via a contactor to the HV charging station for the charging operation. In practice, a contactor is inserted in both main battery lines for safety reasons, in order to attain a complete galvanic separation of the HV battery in the decoupled state. The HV DC voltage intermediate circuit typically includes several HV capacitors connected in parallel.

Due to the not inconsiderable overall capacitance of the high-voltage DC voltage intermediate circuit, which may be in the range of millifarads, a very large current, which at the beginning of the coupling process corresponds to a short-circuit current, arises in the case of direct coupling to the charging station. This current constitutes a high load for all components located in the active circuit at that point in time. In particular, the operational limits of the components may be exceeded in this case. In order to reduce the current during the coupling process, the high-voltage DC voltage intermediate circuit may therefore be precharged before the coupling process is initiated.

An example process for precharging a high-voltage DC voltage intermediate circuit with a precharging current provided by a high-voltage battery of a motor vehicle is described in US 2021/0138924 A1.

In addition, it may be necessary to also precharge capacitances of the high-voltage charging station in order to further reduce the compensating currents during the coupling process. Relays are usually used to galvanically separate a vehicle-side precharging circuit including the high-voltage battery from the charging station. Since precharging currents used during the precharging process are usually small (compared with charging currents during the charging of the high-voltage battery), it is not common to use high-voltage relays for the galvanic separation of the vehicle-side precharging circuit from the charging station. Rather, less expensive Reed relays are used for economic reasons.

Reed relays, however, have the disadvantage that their switching contacts can stick together when large currents develop, so that their function is no longer ensured. It was observed that compensating currents arising when a vehicle-side precharging circuit is coupled to a charging station can cause a significant reduction of the life span of such relays. In the worst case, the transient currents occurring during the precharging process may lead to the result that the switching contacts of the relays can no longer be separated and that, consequently, the high-voltage charging station can no longer be galvanically separated from the vehicle-side precharging circuit.

Against this background, the present disclosure is based on the object of providing a method and a circuit assembly for precharging a high-voltage DC voltage intermediate circuit for a motor vehicle, which ensure an operationally safe coupling of the high-voltage DC voltage intermediate circuit to a high-voltage charging station in a simple operational or constructional manner. The method and the circuit assembly are supposed to permit a reduction of the system complexity and be capable of being implemented in a cost-effective manner. Moreover, the present disclosure is based on the object of providing a motor vehicle, in particular an electric vehicle, with the advantageous properties presented herein.

It must be noted that the features cited individually in the claims can be combined with each other in any technologically meaningful manner (also across the boundaries of categories, such as method and device) and represent other embodiments of the present disclosure. The description, in particular in connection with the Figures, additionally characterizes and specifies the disclosed embodiments.

It may also be noted that a conjunction "and/or" used hereinafter, which is situated between two features and links them to each other, should always be interpreted such that, in a first embodiment of the subject matter according to the disclosed embodiments, only the first feature may be provided, in a second embodiment, only the second feature may be provided, and in a third embodiment, both the first and the second feature may be provided.

Further, a term "about" used herein is supposed to specify a tolerance range which the person skilled in the art working in the present field considers to be common. In particular, the term "about" is to be understood to mean a tolerance range of the quantity concerned of up to a maximum of +/−20%, preferably up to a maximum of +/−10%.

Relative terms concerning a feature, such as "larger", "smaller", "higher", "lower" and the like are to be interpreted such, within the framework of the present disclosure, that deviations in size of the feature concerned, which are caused by production and/or realization and are within the production/realization tolerances defined for the respective production or realization of the feature concerned, do not fall under the respective relative term. In other words, a size of a feature is to be considered as being, for instance, "larger", "smaller", "higher", "lower" etc. than a size of a compared feature only if the two compared sizes differ so clearly in their amount that this difference in size certainly does not fall under the tolerance range caused by the production/realization of the feature concerned, but rather is the result of targeted action.

According to the disclosed embodiments, a method for precharging a high-voltage DC voltage intermediate circuit for a motor vehicle, e.g. an electric vehicle such as a BEV or HEV, includes the steps of:

providing a high-voltage battery with battery terminals to which the high-voltage DC voltage intermediate circuit is electrically coupled, electrically coupling intermediate circuit terminals provided by the high-voltage DC voltage intermediate circuit to corresponding station terminals of a high-voltage charging station for providing a charging current to be supplied for charging the high-voltage battery via the high-voltage DC voltage intermediate circuit, wherein the intermediate circuit terminals are each selectively electrically coupled to corresponding feeding points of the high-voltage DC voltage intermediate circuit via charging current-connecting switching elements by opening and closing, wherein the switching elements are opened prior to coupling the intermediate circuit terminals to the station terminals, first equalization of electric potentials of the feeding points to each other in a respectively open state of the switching elements by means of a first precharging current, closing the switching elements, and second equalization of a voltage existing between the intermediate circuit terminals to a nominal charging voltage of the high-voltage charging station by changing the potential of at least one of the feeding points by means of a second precharging current.

Without being stringently limited thereto, the high-voltage battery may be provided, for instance, to supply a high-voltage on-board supply system of the vehicle, e.g. an electric drive of an electric vehicle, such as a hybrid electric vehicle (HEV) or a battery electric vehicle (BEV).

The high-voltage battery (e.g. a traction battery) may be designed as an energy storage unit with a nominal voltage of 400 V or 800 V, for instance. Nominal voltages deviating therefrom are conceivable and not excluded from the disclosed embodiments.

The charging station that can be used for charging the high-voltage battery may provide a nominal charging voltage of 400 V or 800 V, for instance. Nominal voltages deviating therefrom are conceivable and not excluded from the disclosed embodiments.

A combination of a nominal charging voltage of 400 V provided by a charging station for charging a high-voltage battery with a nominal battery voltage of 800 V is conceivable and, due to the advantages presented herein, a preferred application of the disclosed embodiments without, however, being necessarily limited thereto.

An electric device that electrically couples several electric grids on an interposed current or voltage plane may be considered to be a high-voltage DC voltage intermediate circuit. In this way, the DC power supply system on the charging station side can be coupled to the DC power supply system on the battery side.

In the sense of the present disclosure, the equalization of electric potentials to each other is to be understood to mean that a voltage difference between the respective electric potentials is, at most, a few volts after equalization. In any case, this voltage difference is less than 60 V, preferably less than 25 V, and still more preferably less than 12 V, e.g. 10 V.

The equalization of the voltage existing between the intermediate circuit terminals to the nominal charging voltage provided on the station side is to be understood to mean that the voltage between the intermediate circuit terminals has, at most, a difference of a few volts from the nominal charging voltage after equalization. This voltage difference may be less than 10 V, in particular less than 5 V, and more preferably less than 1 V. This ensures that no large compensating currents (i.e. transients) flow when the charging process is started.

The particular advantage of the present embodiments that only the charging current-connecting switching elements are used for precharging the high-voltage DC voltage intermediate circuit. Other switching elements, e.g. Reed relays, for galvanically coupling/decoupling on the charging station side only those components involved in precharging the HV DC voltage intermediate circuit are completely dispensed with, in the present disclosure, for precharging the high-voltage DC voltage intermediate circuit. The galvanic separation of the high-voltage DC voltage intermediate circuit, or of the precharging circuit causing the precharging, from the charging station is carried out exclusively by the charging current-connecting switching elements, which may preferably be configured as so-called contactors, i.e. as electromagnetic switches, which are designed for high switching powers and, in parallel with the connectable main circuit (i.e. charging circuit), have a control circuit for controlling the respective contactor. Accordingly, the charging current-connecting switching elements are inserted into the charging current path between the HV charging station and the HV DC voltage intermediate circuit, preferably one charging current-connecting switching element in the positive and one in the negative current path.

Since the additional relays (e.g. Reed relays) for galvanically decoupling the battery-side precharging circuit from the charging station can be dispensed with according to the disclosed embodiments, the coupling of the high-voltage DC voltage intermediate circuit to the high-voltage charging station, both from a design and an operational point of view, can be realized in a simpler and more cost-effective manner (e.g. reduction of system complexity, fewer components, etc.). Moreover, operational safety is increased even further because the charging current-connecting switching elements are naturally designed for switching the operational charging currents, i.e. their operational life is not affected by the occurring precharging currents because they are much smaller than the charging currents that occur or are to be connected during a charging process. Accordingly, a sticking together of the switching contacts of the charging current-connecting switching elements in a precharging process can be excluded.

According to an advantageous development of the disclosed embodiments, the first equalization takes place by means of operationally generated switching losses of a direct current converter (DC-to-DC converter) inserted into a charging current path between one of the feeding points and one of the battery terminals. Using the direct current converter disposed in the charging current path, the charging current from the high-voltage charging station to the high-voltage battery during a charging process can be controlled or stabilized, for instance. In addition, the DC-to-DC converter can carry out a voltage conversion, i.e. a compensation in case of a difference between the high-voltage DC voltage on the charging station side and the high-voltage DC voltage on the battery side, wherein the latter is not absolutely required if the charging current substantially corresponds to the battery voltage (e.g., both voltages 400 V or 800 V).

In any case, a direct current converter that is provided anyway may advantageously be used as a charge pump in the present example, in order to equalize the electric potentials of the feeding points in a respectively open state of the charging current-connecting switching elements. That means that the first precharging current is fed from the switching losses of the DC-to-DC converter, which as such always occur, so that further components can be dispensed with.

Another advantageous embodiment with an existing direct current converter provides that a voltage difference between a nominal voltage of the high-voltage battery and a nominal voltage of the high-voltage charging station, which is smaller than the nominal voltage of the high-voltage battery, is compensated with the direct current converter during the providing of the charging current by the high-voltage charging station. In this way, it is possible to charge the high-voltage battery with a higher nominal battery voltage at a charging station with a lower nominal charging voltage. For instance, an 800 V battery can be charged at a 400 V charging station by the DC-to-DC converter bridging the voltage difference between the two nominal voltages of 400 V during a charging process. Conversely, the HV DC voltage intermediate circuit can be precharged from the 800 V battery, wherein the HV DC voltage intermediate circuit is connected on the station side to the 400 V charging station.

In the two preceding examples, the second equalization of the voltage existing between intermediate circuit terminals to the nominal charging voltage of the high-voltage charging station takes place such that the difference in potential between the feeding points of the HV DC voltage intermediate circuit is equalized to the full nominal battery voltage (in the case of the 400 V battery) or to half the nominal battery voltage (in the case of the 800 V battery).

According to another advantageous exemplary embodiment, the second equalization can take place by means of a step-down converter operated in an inverted manner. Thus, a negative output voltage (e.g. −400 V) can be generated from a positive input voltage (e.g. +400 V) with only little additional effort. The voltage difference between the positive input voltage and the negative output voltage of the step-down converter operated in an inverted manner can be used, starting from a center potential to which one of the station terminals of the charging station is coupled, for applying the positive voltage potential to one of the battery terminals and the negative voltage potential to the other battery terminal, in order be able to provide twice the nominal charging voltage on the battery side.

Preferably, the first and the second precharging current are provided by the high-voltage battery. The entire precharging process on the battery side and on the charging station side can then be carried out exclusively with the means on the battery side, irrespective of the specific conditions of the respective charging station.

According to another preferred embodiment of the present disclosure, a charging readiness is signaled, after the second equalization, to the charging station for providing the charging current. In other words, after successfully carrying out the precharging process, the charging readiness is signaled in order to put the HV charging station into a charging operation mode and charge the HV battery. For instance, signaling may be carried out by means of dedicated electric signals, a data protocol or the like.

According to another aspect of the present disclosure, a circuit assembly for precharging a high-voltage DC voltage intermediate circuit for a motor vehicle, e.g. an electric vehicle (EV) or hybrid electric vehicle (HEV), has a high-voltage battery (e.g. a traction battery) with battery terminals to which the high-voltage DC voltage intermediate circuit is electrically coupled. Moreover, there are provided intermediate circuit terminals of the high-voltage DC voltage intermediate circuit for the selective electrical coupling to corresponding station terminals of a high-voltage charging station for providing a charging current to be supplied for charging the high-voltage battery via the high-voltage DC voltage intermediate circuit. Moreover, charging current-connecting switching elements are provided for selectively electrically coupling the respective intermediate circuit terminals to corresponding feeding points of the high-voltage DC voltage intermediate circuit, as well as a precharging circuit, which is configured to, firstly, equalize electric potentials of the feeding points to each other in a respectively open state of the switching elements by means of a first precharging current, and then, secondly, to equalize, in a respectively closed state of the switching elements, a voltage existing between the intermediate circuit terminals to a nominal charging voltage of the high-voltage charging station by changing the potential of at least one of the feeding points by means of a second precharging current.

It is noted that, with regard to device-related definitions of terms and the effects and advantages of features of the device, reference may made in full to the disclosure of corresponding definitions, effects and advantages of the method according to the present disclosure and vice versa. Accordingly, disclosures contained herein regarding the method according to the disclosed embodiments may also be used, mutatis mutandis, for defining the circuit assembly according to the disclosed embodiments unless expressly excluded herein. Conversely, disclosures contained herein regarding the circuit assembly according to the disclosed embodiments may be used, mutatis mutandis, for defining the method according to the disclosed embodiments unless also expressly excluded herein. Thus, a repetition of explanations of features that are basically the same, their effects and advantages may be largely omitted herein for the sake of a more compact description, without such omissions having to be interpreted as limitations for the respective subject matter of the disclosed embodiments.

The high-voltage battery (e.g. a traction battery) may supply a high-voltage on-board supply system including an electric drive of an electric vehicle without being absolutely limited to such a use.

The high-voltage battery may have a nominal voltage of 400 V or 800 V, for instance. Nominal voltages deviating therefrom are conceivable and not excluded from the present disclosure.

The high-voltage charging station may provide a nominal voltage of 400 V or 800 V. Nominal voltages deviating therefrom are conceivable and not excluded from the present disclosure.

A combination of a nominal charging voltage of 400 V provided by a charging station for charging a high-voltage battery with a nominal battery voltage of 800 V is conceivable and constitutes a particularly preferred application of the disclosed embodiments without, however, being necessarily limited thereto.

The respective precharging currents are preferably derived from the high-voltage battery. Alternatively, they may also be derived from another energy source in addition to the HV battery, which would result in an increase in the circuit and operational complexity and additional components, but is not excluded.

According to an advantageous development of the present disclosure, the precharging circuit has a direct current converter (DC-to-DC converter) inserted into a charging current path between one of the feeding points and one of the battery terminals, wherein the direct current converter is provided for providing the first precharging current, which is fed from operationally generated switching losses of the direct current converter.

Another embodiment of the present disclosure provides that the direct current converter is provided for compensating a voltage difference between a nominal voltage of the high-voltage battery (e.g. 800 V) and a nominal voltage of the high-voltage charging station (e.g. 400 V), which is smaller than the nominal voltage of the high-voltage battery, during the providing of the charging current by the high-voltage charging station.

According to another advantageous development of the subject matter of the present disclosure, the precharging circuit has a step-down converter that can be operated in an inverted manner, for providing the second precharging current.

According to another preferred embodiment, a signaling unit is provided for signaling, after the second equalization, a charging readiness to the high-voltage charging station for providing the charging current. For instance, signaling may be carried out by means of dedicated electric signals, a data protocol etc.

According to yet another aspect of the present disclosure, a motor vehicle according to the disclosed embodiments (e.g. an electric or hybrid vehicle) has a high-voltage battery (e.g. a traction battery) with battery terminals to which a high-voltage DC voltage intermediate circuit is electrically coupled, wherein the high-voltage DC voltage intermediate circuit has intermediate circuit terminals for the selective electrical coupling to corresponding station terminals of a high-voltage charging station for providing a charging current to be supplied for charging the high-voltage battery via the high-voltage DC voltage intermediate circuit, and further has charging current-connecting switching elements for selectively electrically coupling the respective intermediate circuit terminals to corresponding feeding points of the high-voltage DC voltage intermediate circuit, and a precharging circuit, which is configured to, firstly, equalize electric potentials of the feeding points to each other in a respectively open state of the switching elements by means of a first precharging current, and then, secondly, to equalize, in a respectively closed state of the switching elements, a voltage existing between the intermediate circuit terminals to a nominal charging voltage of the high-voltage charging station by changing the potential of at least one of the feeding points by means of a second precharging current.

In particular, the motor vehicle according to the present disclosure, preferably by means of a correspondingly configured control unit (e.g. an electronic control device with a microprocessor, a microcontroller or the like, and, if necessary, a storage unit, such as RAM, ROM, Flash, etc.), is configured to carry out a method for precharging the high-voltage DC voltage intermediate circuit in accordance with any one of the embodiments disclosed herein.

Otherwise, the statements already made above with regard to the circuit assembly and the of the present disclosure, i.e. that with regard to vehicle-related definitions of terms and the effects and advantages of features of the vehicle, reference may made in full to the disclosure of corresponding definitions, effects and advantages of the method according to the disclosed embodiments and the circuit assembly according to the disclosed embodiments and vice versa.

Figure 2:
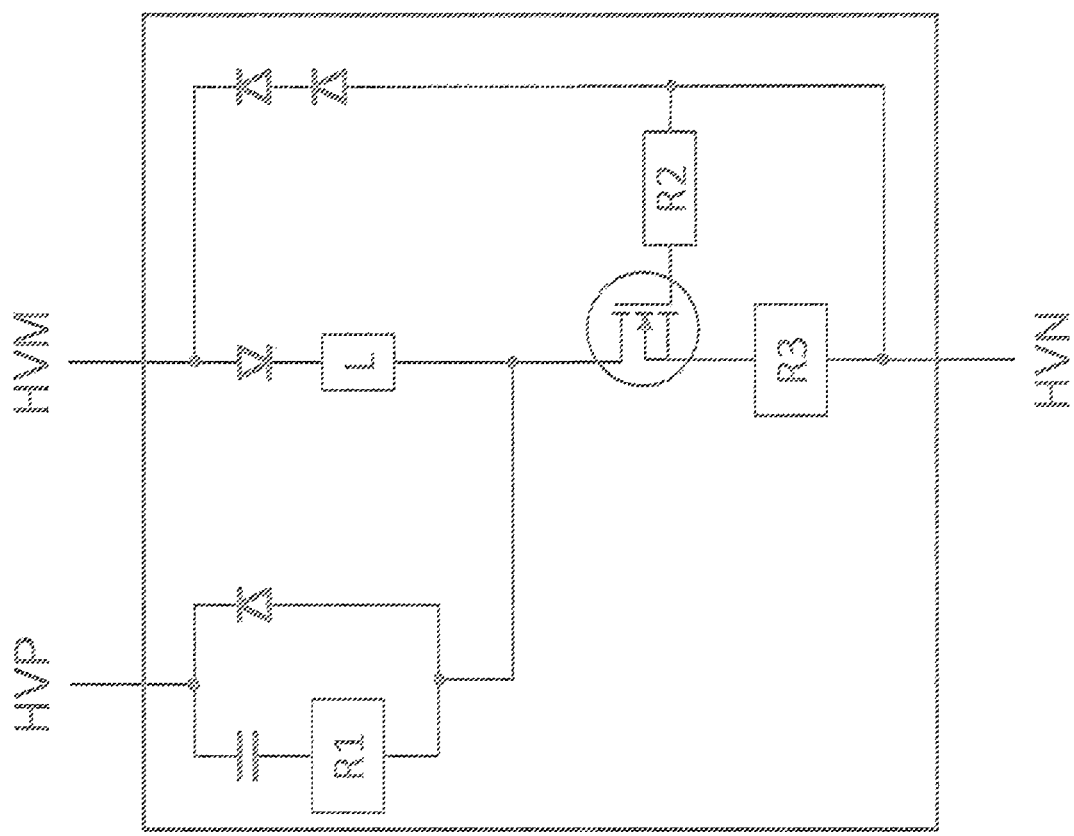
Figure 2:

Other advantages and features of the disclosed embodiments become apparent from the following description of example embodiments of the present disclosure, which shall be understood not to be limiting and which will be explained below with reference to the drawing. In this drawing, the Figures schematically show:

FIG. 1 a block circuit diagram of an exemplary embodiment of a circuit assembly and a vehicle according to an embodiment, FIG. 2 a part of a precharging circuit of the circuit assembly from FIG. 1, and FIG. 3 a process chart of an exemplary embodiment of a method according to an embodiment.

In the various figures, parts that are equivalent with respect to their function are always provided with the same reference numerals, so that they are also only described once, as a rule.

FIG. 1 schematically shows a block circuit diagram of an exemplary embodiment of a circuit assembly 1 and a vehicle 2 according to the embodiment.

The motor vehicle 2 in FIG. 1, e.g. an electric or hybrid vehicle without being absolutely limited thereto, has a high-voltage battery BAT with battery terminals HVP (high-voltage positive), HVN (high-voltage negative) to which a high-voltage DC voltage intermediate circuit 3 is electrically coupled. The depicted high-voltage DC voltage intermediate circuit 3 further has intermediate circuit terminals 4 (e.g. a plug-in connector of a charging cable) for the selective electrical coupling to corresponding station terminals HV+ (station-side high-voltage plus), HV− (station-side high-voltage minus) of a high-voltage charging station CS for providing a charging current to be supplied for charging the high-voltage battery BAT via the high-voltage DC voltage intermediate circuit 3. The HV DC voltage intermediate circuit 3 further has charging current-connecting switching elements 5 for selectively electrically coupling the respective intermediate circuit terminals 4 to corresponding feeding points 6 of the high-voltage DC voltage intermediate circuit 3.

As can be seen in FIG. 1, one charging current-connecting switching element 5 is inserted into each of the positive current path towards the station terminal HV+ and the negative current path towards the station terminal HV−. On the battery side, each charging current-connecting switching element 5 is electrically connected to the corresponding feeding point 6.

Moreover, the HV DC voltage intermediate circuit 3 shown in FIG. 1 has a precharging circuit 7. The latter is configured and adapted to, firstly, equalize electric potentials HVP (i.e. battery-side positive potential) and HVM (i.e. battery-side center potential, explanation thereof see below) of the feeding points 6 to each other in a respectively open state of the switching elements 5 by means of a first precharging current, and then, secondly, to equalize, in a respectively closed state of the switching elements 5, a voltage U_CS (i.e. the station-side terminal voltage) existing between the intermediate circuit terminals 4 to a nominal charging voltage of the high-voltage charging station CS by changing the potential of at least one of the feeding points 6 by means of a second precharging current.

The first equalization of the electric potentials HVP and HVM to each other is effected such that a voltage difference between the two potentials is, at most, a few volts after equalization. Preferably, this voltage difference is less than 25 V, and still more preferably less than 12 V, e.g. 10 V or even less.

In the exemplary embodiment of the circuit assembly 1 or of the motor vehicle 2 shown in FIG. 1, the HV charging station CS, as an example, provides a nominal charging voltage of 400 V. As an example, the nominal voltage of the HV battery BAT is 800 V. The disclosed embodiment is neither stringently limited to this nominal voltage, nor to the combination of a provided nominal charging voltage of the HV charging station CS which is half the size of the nominal battery voltage of the HV battery BAT. It is also conceivable that the nominal charging voltage of the HV charging station CS is of the same size as the nominal battery voltage of the HV battery BAT.

In any case, the precharging circuit 7 shown in FIG. 1 has a direct current converter or DC-to-DC converter inserted into a charging current path, in the present case in the current path of the station terminal HV−, between the corresponding feeding point 6 of the switching element 5 assigned to this current path and one of the battery terminals, in the present case the negative battery terminal HVN.

Advantageously, the DC-to-DC converter is used for providing the first precharging current, which is fed from operationally generated switching losses of the direct current converter. Accordingly, the switching losses of the DC-to-DC converter are used for equalizing the potentials HVP and HVM towards each other. In this operational state (i.e. during the first equalization), the DC-to-DC converter is used as a charge pump.

Generally, during the providing of the charging current by the high-voltage charging station CS in the present exemplary embodiment of the circuit assembly 1, the direct current converter DC/DC serves for compensating a voltage difference between a nominal voltage of the high-voltage battery BAT and a nominal voltage of the high-voltage charging station CS (e.g. 400 V) which, as was already mentioned, is smaller in the present case than the nominal voltage of the high-voltage battery BAT (e.g. 800 V).

In FIG. 1, it can be seen that on the intermediate circuit side, a high-voltage center potential HVM is formed to which the negative station terminal HV− is electrically coupled. On the input side, the DC-to-DC converter is coupled to the HV center potential HVM and, on the output side, to the negative battery terminal HVN. In the presently described exemplary embodiment, the DC-to-DC converter converts the high-voltage center potential HVM such that, in total, a voltage which corresponds in magnitude to the nominal battery voltage (in the present case, 800 V, for instance) exists between the battery terminals HVP and HVN. Deviations from the exact nominal battery voltage of the HV battery caused by the respective charging method are covered by the preceding description.

As is also indicated in FIG. 1, the circuit assembly 1 may have a signaling unit 8 for signaling a charging readiness to the high-voltage charging station CS for providing the charging current. Charging readiness is signaled when the second equalization of the station-side terminal voltage U_CS by means of the precharging circuit 7 is completed. Signaling can be carried out via one (or several) signaling line(s) 9, which may be so-called handshake lines, to the HV charging station CS. Dedicated electric signals, data communication protocols, etc. may be used for this purpose. The communication direction may be configured to be only unidirectional towards the HV charging station CS or also bidirectional between the HV charging station CS and the HV DC voltage intermediate circuit 3 or the motor vehicle 2.

The signaling unit 8 may have a microprocessor, a microcontroller and the like and, if necessary, a storage unit such as a RAM, ROM, Flash etc. The signaling unit 8 may also be configured as a control unit for controlling the HV DC voltage intermediate circuit 3 in the sense of the disclosed embodiment. In this case, the signaling unit 8 may generally also be referred to as a control unit.

FIG. 1 shows the circuit assembly 1 in a state of being electrically coupled to the HV charging station CS via the intermediate circuit terminals 4.

In a preferred embodiment, the precharging circuit 7 of the HV DC voltage intermediate circuit 3 has a step-down converter that can be operated in an inverted manner, for providing the second precharging current.

An exemplary embodiment of such a step-down converter is shown in FIG. 2, which shows a part of the precharging circuit 7 of the circuit assembly 1 from FIG. 1. FIG. 2 shows a circuit of various ohmic resistors R, a coil L, diodes not labeled in any more detail, a capacitor and a transistor switching element.

After the first equalization of the potentials HVP and HVM to each other with opened switching elements 5 is completed and the station-side terminal voltage U_CS is close to 0 V, in particular, is less than 12 V, the charging current-connecting switching elements 5 are closed and the second equalization of the station-side terminal voltage U_CS to the nominal voltage of the HV charging station is executed. In the presently described exemplary embodiment, the change in potential of the feeding point 6 of the HV center potential HVM is carried out with the step-down converter 10 shown in FIG. 2, i.e. the step-down converter 10 provides the second precharging current required for this purpose.

In other words, the HV center potential HVM, starting from the potential state equalized to the battery-side positive HV potential HVP during the first equalization is precharged to half the nominal battery voltage (i.e., in the present example, to 400 V).

In those cases in which the nominal charging voltage of the HV charging station CS matches the nominal voltage of the HV battery BAT, the HV center potential HVM would be precharged to the full nominal battery voltage (e.g., to 400 V or 800 V, depending on the available charging operation mode of the HV charging station CS).

FIG. 3 depicts a process chart of an exemplary embodiment of a method 100 according to the embodiment. The exemplary method 100 serves for precharging a high-voltage DC voltage intermediate circuit, e.g. the HV DC voltage intermediate circuit 3 shown in FIG. 1. Hereinafter, reference is made as an example to the circuit assembly 1 shown in FIG. 1 when describing the method 100. However, the method is not absolutely limited to the specific circuit assembly 1 from FIG. 1.

In Step 110, the high-voltage battery BAT with battery terminals HVP, HVN is provided, to which the high-voltage DC voltage intermediate circuit 3 is electrically coupled.

In Step 120, the intermediate circuit terminals 4 provided by the high-voltage DC voltage intermediate circuit 3 are then coupled to the corresponding station terminals HV+, HV− of the high-voltage charging station CS for providing a charging current to be supplied for the charging of the high-voltage battery BAT via the high-voltage DC voltage intermediate circuit 3. That means, a charging cable can be connected with a charging plug to the HV charging station CS.

As was already explained in connection with FIG. 1, the intermediate circuit terminals 4 are each selectively electrically coupled to the corresponding feeding points 6 of the high-voltage DC voltage intermediate circuit 3 via the charging current-connecting switching elements 5 by opening and closing, wherein the switching elements 5, which may be configured as contactors, for example, are opened prior to coupling the intermediate circuit terminals 4 to the station terminals HV+, HV−.

In the next step 130, the electric potentials HVP, HVM of the feeding points 6 are equalized to each other in a respectively open state of the switching elements 5 by means of a first precharging current. The equalization is effected such that a remaining voltage difference between the potentials HVP and HVM is, at most, a few volts after equalization, in particular at most 25 V and, more preferably, at most 12 V, e.g. 10 V or even less.

As was already described in connection with FIG. 1, the first equalization in the HV DC voltage intermediate circuit 3 shown in FIG. 1 is carried out by means of operational switching losses of the direct current converter DC/DC inserted into the charging current path between one of the feeding points 6 and the battery terminal HVN. In the exemplary circuit assembly 1 from FIG. 1, the direct current converter DC/DC primarily serves for compensating a voltage difference between the nominal voltage of the high-voltage battery BAT (e.g. 800 V) and the nominal voltage of the high-voltage charging station CS (e.g. 400 V), which is smaller than the nominal voltage of the high-voltage battery BAT, during the providing of the charging current by the high-voltage charging station CS.

In a subsequent step 140, the charging current-connecting switching elements 5 are closed. This is possible because the potentials HVP and HVM were equalized in the preceding step 130, i.e. have a small voltage difference of a few volts at most. In the present example, the closing of the switching elements 5 couples the positive battery terminal HVP to the positive station terminal HV+ and the intermediate circuit-side HV center potential HVM to the negative station terminal HV−.

In the subsequent step 150, voltage U_CS (i.e. the station-side terminal voltage) existing between the intermediate circuit terminals 4 is equalized to a nominal charging voltage of the high-voltage charging station CS by changing the potential of at least one of the feeding points 6 by means of a second precharging current. In the present exemplary case, the feeding point 6 (i.e. the HV center potential HVM) electrically coupled to the negative station terminal HV− is precharged to half the nominal battery voltage of the HV battery BAT, so that in the present case, the station-side terminal voltage U_CS is substantially 400 V and the battery-side terminal voltage between HVP and HVN is 800 V. The voltage difference of 400 V between the HV center potential HVM and the negative battery terminal HVN is bridged by the DC-to-DC converter.

If the nominal voltage of the HV charging station CS and the nominal voltage of the HV battery BAT are substantially equal to each other, the HV center potential would be precharged to the full nominal battery potential (e.g. 400 V or 800 V) during the second equalization. In that case, the DC-to-DC converter would no longer carry out a transformation of the input-side and output-side voltage planes (if the two were the same) but could be used to further stabilize, smoothen, control precisely the charging current and the like.

In the present example, the second precharging current is generated and provided by the step-down converter 10 operated in an inverted manner (see FIGS. 1 and 2).

Both the first and the second precharging current are provided by the high-voltage battery HV so that the HV DC voltage intermediate circuit 3 is precharged independently of the HV charging station CS.

After the second equalization, a charging readiness of the HV battery BAT and of the HV DC voltage intermediate circuit 3 can be signaled to the HV charging station CS (e.g. by means of the signaling unit 8). Then, the HV charging station CS provides the charging current flowing via the switching elements 5 in the charging current path towards the HV battery BAT.

The circuit assembly according to the embodiment and the method for precharging a high-voltage DC voltage intermediate circuit for a motor vehicle and the respective motor vehicle disclosed herein are not limited to the specific embodiments respectively described herein, but also include further embodiments having the same effects, which result from technically viable other combinations of the features of all subject matters of the disclosed embodiments described herein. In particular, the features and combinations of features mentioned above in the general description and the description of the Figures and/or shown in the Figures alone can be used not only in the combinations explicitly specified herein, but also in other combinations or on their own, without departing from the scope of the present disclosure.

In a particularly preferred embodiment, the circuit assembly according to the embodiment is used for precharging a high-voltage DC voltage intermediate circuit in a motor vehicle, in particular an electric or hybrid vehicle, wherein the motor vehicle has a high-voltage battery, in particular a traction battery, with a nominal voltage of 800 V, which is electrically coupled to a high-voltage DC voltage intermediate circuit, which in turn can be temporarily connected to a high-voltage charging station, which provides a nominal voltage of 400 V or 800 V, in order to charge the high-voltage battery from the charging station.

The invention claimed is:

1. A method for precharging a high-voltage direct current (DC) voltage intermediate circuit for a motor vehicle having a high-voltage battery with battery terminals to which the high-voltage DC voltage intermediate circuit is electrically coupled, comprising the steps of:
   electrically coupling intermediate circuit terminals of the high-voltage DC voltage intermediate circuit to corresponding station terminals of a high-voltage charging station for providing a charging current to be supplied for charging the high-voltage battery via the high-voltage DC voltage intermediate circuit, wherein the intermediate circuit terminals are each selectively electrically coupled to corresponding feeding points of the high-voltage DC voltage intermediate circuit via charging current-connecting switching elements by opening and closing, wherein the switching elements are open prior to coupling the intermediate circuit terminals to the station terminals,
   first equalizing of electric potentials of the feeding points to each other in a respectively open state of the switching elements by a first precharging current,
   closing the switching elements, and
   second equalizing of a voltage existing between the intermediate circuit terminals to a nominal charging voltage of the high-voltage charging station by changing the electric potential of at least one of the feeding points by a second precharging current in a respectively closed state of the switching elements;
   wherein the first equalization takes place by operationally generated switching losses of a direct current converter inserted into a charging current path between one of the feeding points and one of the battery terminals.

2. The method according to claim 1, characterized in that a voltage difference between a nominal voltage of the high-voltage battery and a nominal voltage of the high-voltage charging station, which is smaller than the nominal voltage of the high-voltage battery, is compensated with the direct current converter during the providing of the charging current by the high-voltage charging station.

3. The method according to claim 1, characterized in that the second equalization takes place by a step-down converter operated in an inverted manner.

4. The method according to claim 1, characterized in that the first precharging current and the second precharging current are provided by the high-voltage battery.

5. The method according to claim 1, characterized in that a charging readiness is signaled, after the second equalization, to the high-voltage charging station for providing the charging current.

6. A circuit assembly for precharging a high-voltage direct current (DC) voltage intermediate circuit for a motor vehicle having a high-voltage battery with battery terminals to which the high-voltage DC voltage intermediate circuit is adapted to be electrically coupled, comprising:

intermediate circuit terminals of the high-voltage DC voltage intermediate circuit for selective electrical coupling to corresponding station terminals of a high-voltage charging station for providing a charging current to be supplied for charging the high-voltage battery via the high-voltage DC voltage intermediate circuit, charging current-connecting switching elements for selectively electrically coupling the respective intermediate circuit terminals to corresponding feeding points of the high-voltage DC voltage intermediate circuit, and a precharging circuit, which is configured to, firstly, equalize electric potentials of the feeding points to each other in a respectively open state of the switching elements by a first precharging current, and then, secondly, to equalize, in a respectively closed state of the switching elements, a voltage existing between the intermediate circuit terminals to a nominal charging voltage of the high-voltage charging station by changing the electric potential of at least one of the feeding points by a second precharging current;

wherein the precharging circuit has a direct current converter inserted into a charging current path between one of the feeding points and one of the battery terminals, wherein the direct current converter is provided to provide the first precharging current, which is fed from operationally generated switching losses of the direct current converter.

7. The circuit assembly according to claim 6, characterized in that the direct current converter is provided for compensating a voltage difference between a nominal voltage of the high-voltage battery and a nominal voltage of the high-voltage charging station, which is smaller than the nominal voltage of the high-voltage battery, during the providing of the charging current by the high-voltage charging station.

8. The circuit assembly according to claim 6, characterized in that the precharging circuit has a step-down converter that is operated in an inverted manner, for providing the second precharging current.

9. The circuit assembly according to claim 6, characterized by a signaling unit for signaling, after the second equalization, a charging readiness to the high-voltage charging station for providing the charging current.

10. A motor vehicle, characterized by a high-voltage battery with battery terminals to which a high-voltage DC voltage intermediate circuit is electrically coupled, wherein the high-voltage DC voltage intermediate circuit has intermediate circuit terminals for the selective electrical coupling to corresponding station terminals of a high-voltage charging station for providing a charging current to be supplied for charging the high-voltage battery via the high-voltage DC voltage intermediate circuit, further has charging current-connecting switching elements for selectively electrically coupling the respective intermediate circuit terminals to corresponding feeding points of the high-voltage DC voltage intermediate circuit, and a precharging circuit, which is configured to, firstly, equalize electric potentials of the feeding points to each other in a respectively open state of the switching elements by a first precharging current, and then, secondly, to equalize, in a respectively closed state of the switching elements, a voltage existing between the intermediate circuit terminals to a nominal charging voltage of the high-voltage charging station by changing the potential of at least one of the feeding points by a second precharging current; wherein the precharging circuit has a direct current converter inserted into a charging current path between one of the feeding points and one of the battery terminals, wherein the direct current converter is provided to provide the first precharging current, which is fed from operationally generated switching losses of the direct current converter.

11. The motor vehicle according to claim 10, characterized in that the precharging circuit has a step-down converter that is operated in an inverted manner, for providing the second precharging current.

* * * * *